Feb. 9, 1937. F. G. WALKER 2,069,985
DISHWASHING MACHINE
Filed Feb. 5, 1932 5 Sheets-Sheet 1
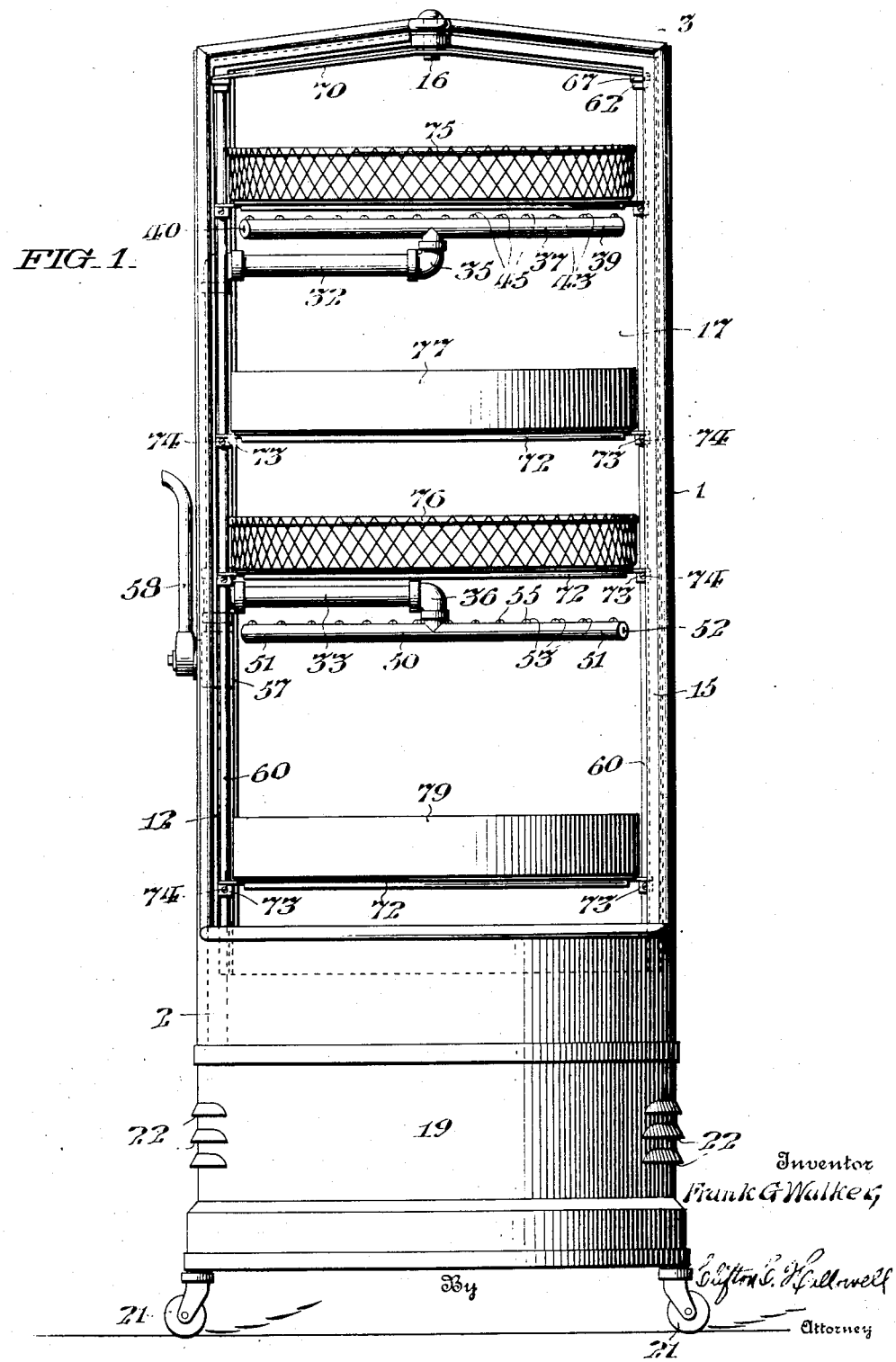

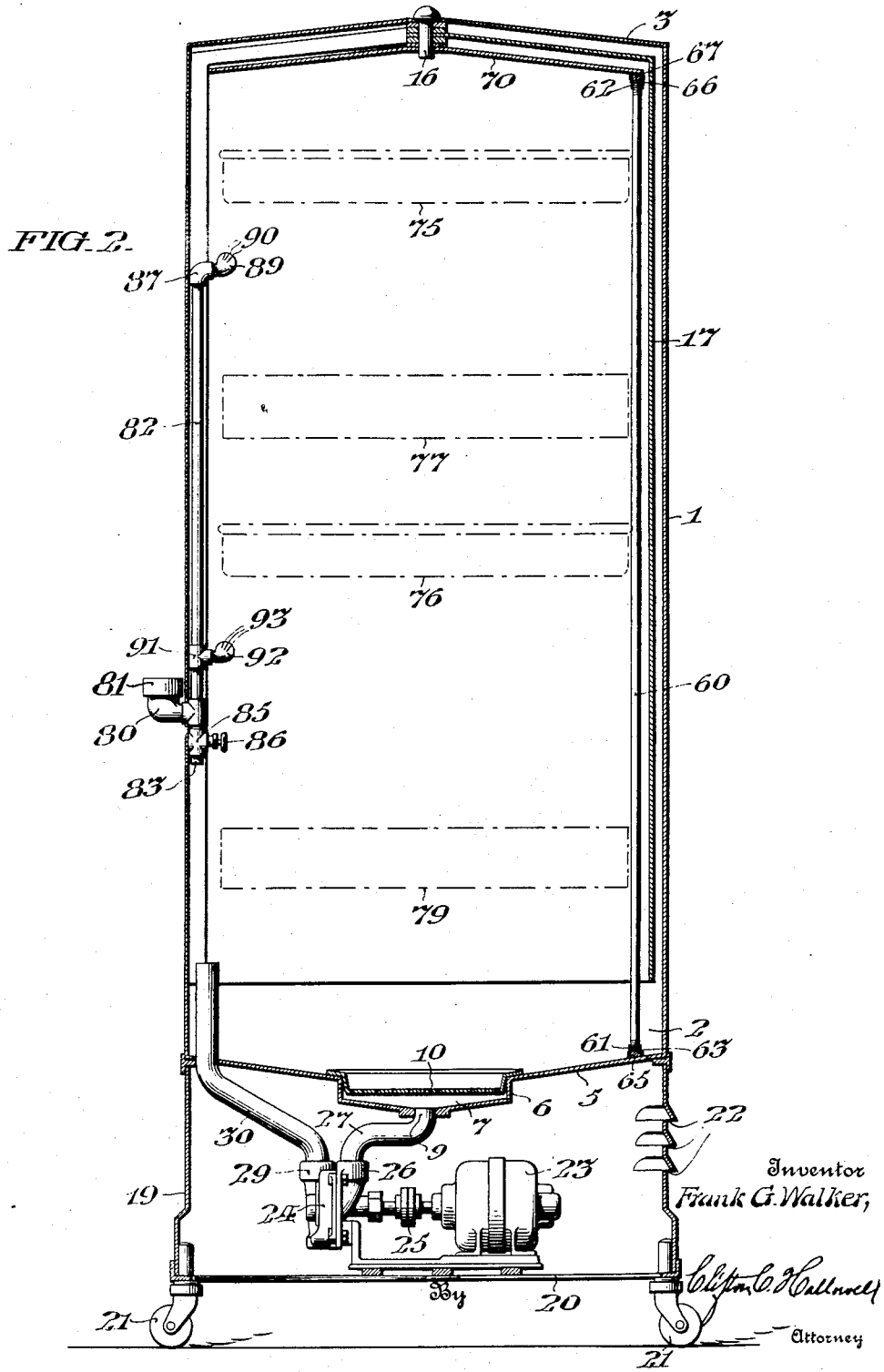

Feb. 9, 1937. F. G. WALKER 2,069,985
DISHWASHING MACHINE
Filed Feb. 5, 1932 5 Sheets-Sheet 3
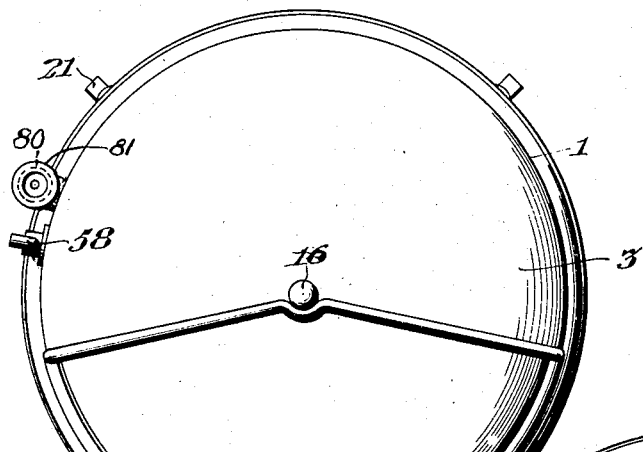
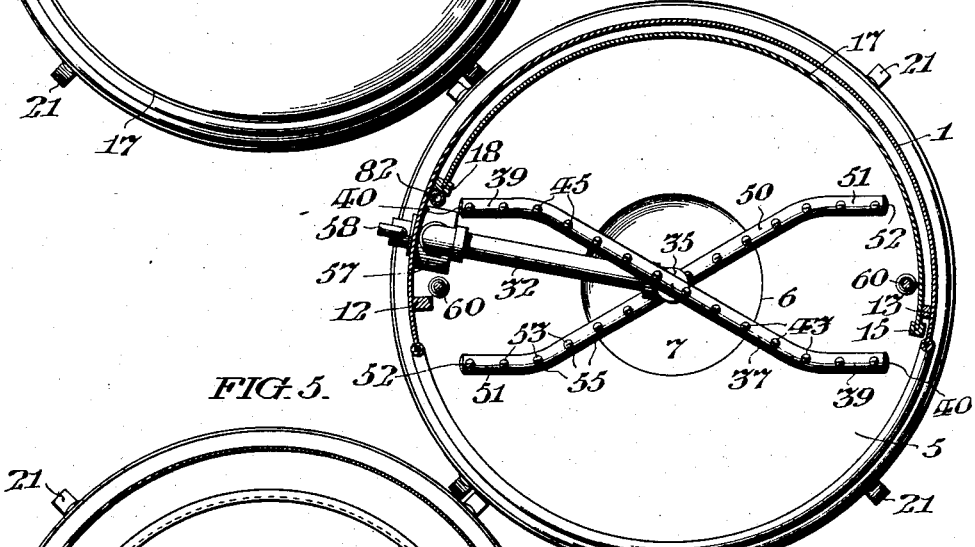
Inventor
Frank G. Walker,
By Clayton C. Hallowell
Attorney Feb. 9, 1937.  F. G. WALKER  2,069,985
DISHWASHING MACHINE
Filed Feb. 5, 1932  5 Sheets-Sheet 4
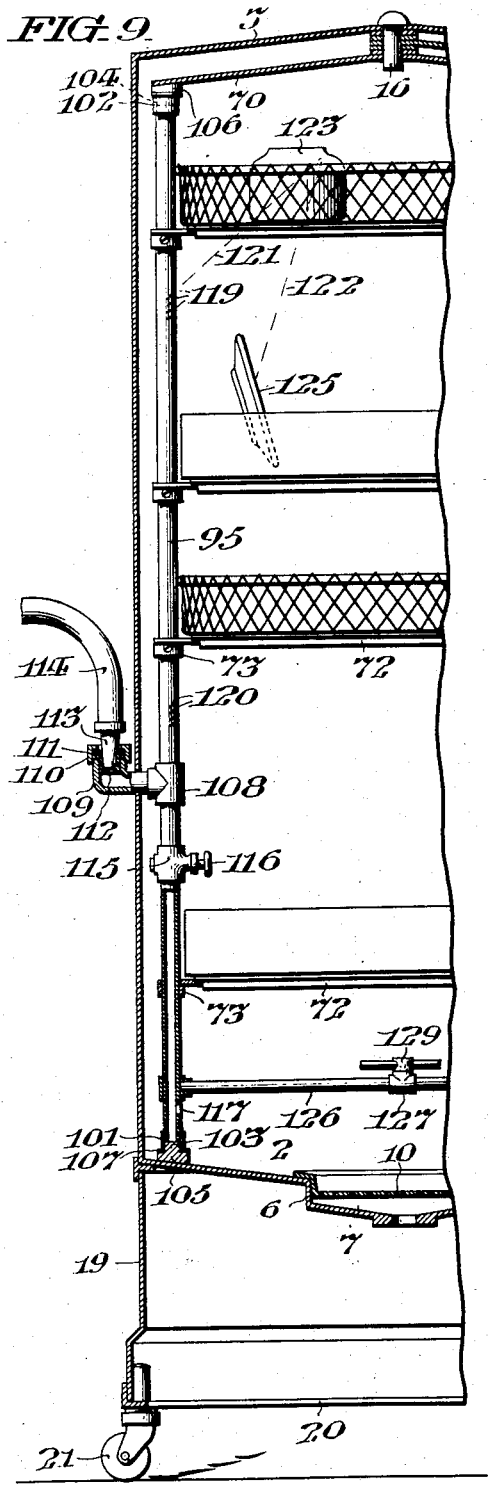
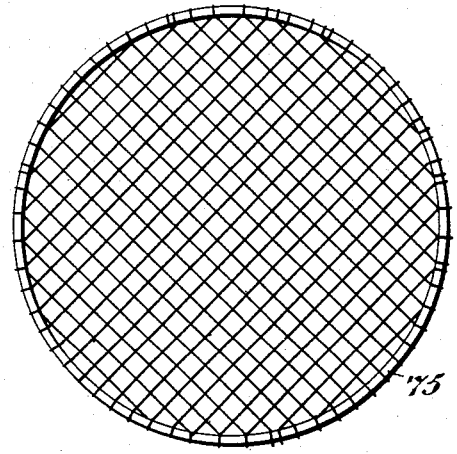
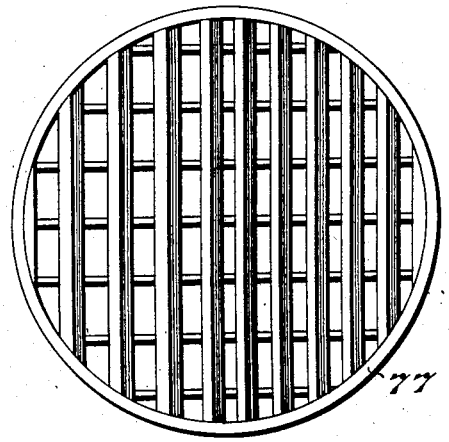
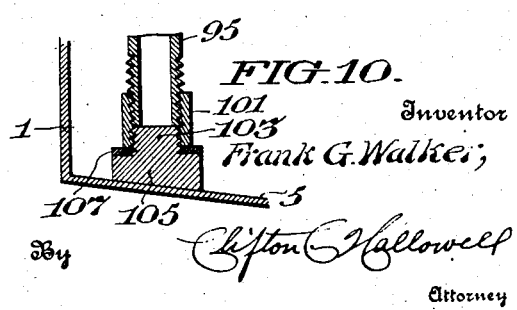
Inventor
Frank G. Walker;
By Clifton G. Hallowell
Attorney

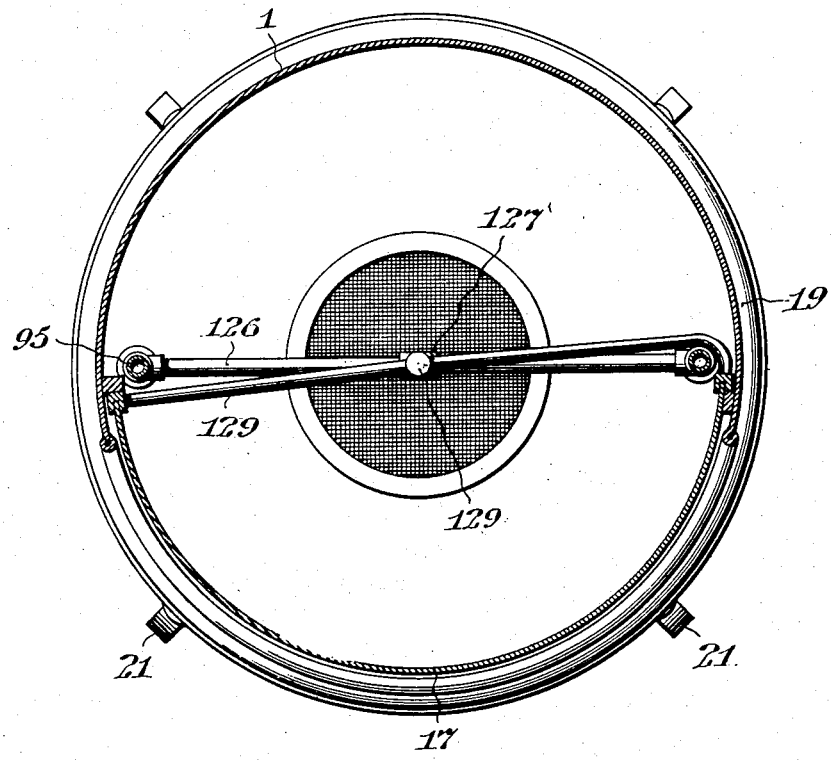

Patented Feb. 9, 1937

2,069,985

UNITED STATES PATENT OFFICE 2,069,985

DISHWASHING MACHINE

Frank G. Walker, Santa Barbara, Calif.

Application February 5, 1932, Serial No. 591,015

12 Claims. (Cl. 141—9)

This invention relates particularly to that type of dish-washing machine that is applicable to household use, and is especially directed to the novel arrangement of the parts whereby efficiency and economy are combined to accomplish the cleansing of dishes.

The principal objects of my invention are to provide a dish-washing machine that is compact and pleasing in its appearance, and that will efficiently wash, rinse and dry quickly and thoroughly in proper sequence all of the dishes of various kinds from an ordinary household table with but a minimum of attention and handling.

Other objects of my invention are to provide a dish-washing machine with a plurality of dish-holding racks so adjustably mounted upon parallel standards as to be readily raised and lowered with respect to each other as well as to spraying means.

Further objects of my invention are to provide a dish-washing machine with separate means for spraying the dishes with cleansing fluid and rinsing fluid respectively disposed in such cooperative relation that the force of either the cleansing fluid or the rinsing fluid is deflected by the cupped or bowl-shaped dishes to wash by a splashing action the substantially flat dishes such as plates or platters.

Another object of my invention is to provide a false top or canopy to which the tray supporting standards may be attached, and to provide both said canopy and the floor of said receptacle with alined fittings with which said standards may be removably and replaceably engaged.

My invention comprehends a dish-washing machine having a cylindrical base enclosing a motor and pump, and forming a separate unit upon which the receptacle body may be removably supported.

My invention further includes tubular standards, for supporting the dish-tray carriers, which may serve to convey the rinsing fluid and be connected exterior to the receptacle with a source of fluid supply.

Specifically stated, the form of my invention as hereinafter described comprises a dish-washing machine having a cylindrical base within which a motor driven pump is conveniently mounted, and upon which base the receptacle including a cylindrical reservoir and semi-cylindriform body having a sloping top is supported, said body being cooperative with a semi-cylindriform door to form a closed cylindrical chamber arranged to receive dishes to be washed. The dishes may be conveniently carried upon trays supported by carriers adjustably mounted to slide up and down on suitably provided uprights or standards which are detachably engaged with fittings carried by the floor of the reservoir and a canopy at the top of the receptacle, and said dishes are held disposed in suitable relation to separate spray ejectors included in conduits respectively arranged to direct sprays or jets of cleansing fluid from the pump, or rinsing fluid from a source of fluid supply as may be desired. The conduits through which the rinsing fluid is directed may include a valve by which fluid may be initially introduced into the reservoir, and said conduit may if desired be one or both of the tray-supporting standards, the walls of which are perforated or saw-cut as may be deemed expedient to direct jets or sprays upwardly against the superposed cup or bowl-shaped dishes to be deflected thereby upon the subjacent dishes.

My invention also includes all of the various novel features of construction and arrangement as hereinafter more definitely specified.

In the accompanying drawings, Figure 1 is a front elevational view of a dish-washing machine constructed in accordance with my invention, and showing the door or closure open and disclosing the interior arrangement; Fig. 2 is a central vertical sectional view of said dish-washing machine taken on the staggered line 2—2 in Fig. 5 and illustrating the motor-driven pump unit and the rinsing mechanism and its connections in elevation, the section being taken in two relatively angular planes intersecting at the vertical axis of the machine casing, the dish-carrying trays being diagrammatically indicated for convenience of illustration; Fig. 3 is a plan view of the machine shown in Figs. 1 and 2, with the door or closure in its closed position; Fig. 4 is a plan sectional view of the machine taken just above the upper spray dispensing manifold; Fig. 5 is a plan sectional view similar to Fig. 4 but taken just above the fresh water inlet and showing the lowermost dish tray carrier; Fig. 6 is a plan view of the cup and bowl holding basket; Fig. 7 is a plan view of the dish holding rack; Fig. 8 is a central transverse sectional view of the dish-holding rack shown in Fig. 7; Fig. 9 is a fragmentary half sectional view taken centrally through the machine and illustrating a modification in the rinsing mechanism whereby the dish tray carrier support may be conveniently utilized as the spraying means as well as the conveyor for the rinsing fluid; Fig. 10 is an enlarged fragmentary sectional view showing the detailed construction whereby the dish tray supporting standards may be removably and replaceably attached to the floor and top of the receptacle; and Fig. 11 is a plan sectional view of the machine shown in Fig. 9, taken just above the door-supporting frame in said Fig. 9.

In said figures, the body of the machine comprises the semicylindrical casing 1 rising from the cylindrical basin or reservoir 2 and terminating in the semiconical roof 3. Said basin or reservoir has the conical hopper bottom 5 provided with a downset central depression 6 forming the pocket 7 having a discharge orifice through which the discharge pipe 9 extends, and affording a convenient recess for the strainer 10 which is readily removable and replaceable, and said casing is provided with the stiles 12 and 13 affording flat surfaces.

The upper wall or roof 3 is provided with the headed pin 16, affording a pintle for the pivoted door or closure 17, which is semicylindriform and which so closely conforms to the casing 1 and roof 3 as to rotate into said casing as indicated in Figs. 3, 4 and 5, or be withdrawn therefrom into complemental relation to provide a cylindriform receptacle as indicated in Figs. 1, 2, 3, 4 and 5. The free edges of said closure 17 are provided with the stiles 15 and 18 arranged to engage the stiles 12 and 13, as shown in Fig. 5, to afford a seal tight joint when said closure is in closed position.

The receptacle body is mounted on the supporting stand comprising the cylindrical base 19 carried by the frame 20 which is provided with the rollers or casters 21, and said cylindrical base may preferably have the ventilator slits or openings 22 and enclose the pump unit which includes the motor 23 and pump 24 suitably coupled by the coupling 25.

The inlet 26 of the pump 24 shown in Fig. 2 is connected by the pipe 27 with the pocket 7 of the reservoir 2, and the outlet 29 is connected by the pipe 30, which extends upwardly through the receptacle, and is provided with the horizontally extended branches 32 and 33, as shown in Fig. 1, the branch 32 terminating in the upturned elbow 35 and the branch 33 terminating in the downturned elbow 36. The pipe 30 as indicated in Fig. 2 is shown in front of the plane of section for convenience of illustration.

Rotatably mounted upon the elbow 35 is a tubular arm or manifold 37 having its end portions 39 bent slightly in opposite directions in a horizontal plane and provided with axially directed orifices 40 through which fluid may be ejected for a twofold purpose, first, to cause said manifold to rotate upon said elbow and second, to flush the inner wall surface of the chamber.

Said manifold 37 is also provided along its upper surface with a plurality of nozzles 43 each preferably provided with a transverse slit 45 through which fluid may be ejected, and although I have, for convenience of illustration, shown said slits 45 disposed in the direction of rotation of said manifold in Fig. 1, they may preferably be disposed parallel to the longitudinal axis of said manifold as shown in Fig. 4 so that the fan-shaped jets ejected therefrom may relatively overlap each other.

Similarly, the elbow 36 rotatably carries the manifold 50 having its end portions 51 bent in opposition to that of the manifold 37 so that the fluid ejected from the axially directed orifices 52 thereof will cause the manifold 50 to rotate in a direction opposite to the rotation of the manifold 37, and the fluid ejected upwardly through the slits 55 of the nozzles 53 will be flung differently from the fluid ejected from the manifold 37, and consequently there will be a wide diffusion of the spray thus ejected.

The pipe 30 leading from the outlet 29 of the pump 24 includes a three-way-valve 57 having a tubular handle 58 which is so connected with one of the valve passageways that when turned from the position shown in Fig. 1 to a substantially horizontal position, the fluid passing through the pipe 30 will be diverted from that portion of said pipe above the valve 57, and will be discharged through said tubular handle 58 serving as a nozzle to direct the fluid from the pump and discharge it into a sink or other receiver.

As shown in Figs. 1, 2, 4 and 5, suitably disposed standards 60 extend through the washing chamber preferably in closely adjacent relation to the walls of the receptacle 1. Said standards, as best shown in Fig. 2, may preferably have their end portions threaded and provided with threaded sleeves 61 and 62, the sleeves 61 being threadedly engaged with the threaded projecting bosses 63 extending from fitting 65 secured to the floor of the receptacle, and the sleeves 62 being threadedly engaged with the threaded projecting bosses 66 depending from the fittings 67 secured to the false top or canopy 70.

The standards 60 are arranged to support the dish-tray grilles or carriers 72 preferably formed of an annulus of angle-iron and having the collars 73 mounted to slide up and down on said standards 60 and be adjustably engaged in any adjusted position thereon by the set-screws 74 or wing-nuts, as may be deemed expedient.

The grilles or carriers 72, which are closely associated with the manifolds 37 and 50, respectively, support in removable relation the wire mesh baskets 75 and 76 that are particularly adapted to carry cups or bowls or similar cup-shaped dishes in an inverted position to receive therein substantially the full force of the jets or sprays ejected through the nozzles 43 and 53 and to cooperate therewith in deflecting the fluid downward therefrom by a splashing action on to the dishes carried by the dish-racks 77 and 79 respectively subjacent to the baskets 75 and 76 and carried by the grilles or carriers 72 that are respectively disposed beneath the manifolds 37 and 50.

As best shown in Figs. 2 and 5, water may be introduced into the receptacle to charge the reservoir or basin 2 by means of the inlet fitting 80 which is L-shaped and provided with the cap 81. The structural details of said fitting will be hereinafter described in connection with the description of the modification illustrated in Fig. 9.

Said inlet fitting 80 is connected through the wall of the receptacle 1 with the pipe 82 extending in closely adjacent relation to said wall and having the depending nozzle 83 controlled by the valve 85, the hand-wheel 86 of which projects inwardly as shown in Fig. 2, but obviously may, if desired, be extended outwardly through the wall of the receptacle 1, to be controlled from without.

Said pipe 82 is arranged not only to introduce fresh water into the basin 2, but is designed to convey rinsing fluid to rinse the dishes in the baskets 75 and 76 and in the racks 77 and 79 and is provided with the L-shaped terminal fitting 87 carrying the rinse spraying head 89, having the upwardly inclined apertures or slits 90 through which rinsing fluid is forced upwardly in relatively different planes against the cup-shaped dishes in the basket 75 to be splashed by deflection on to the dishes in the subjacent rack 77, said pipe being also provided with the T-shaped fitting 91 carrying the rinse spraying head 92 having upwardly inclined apertures or slits 93 through which rinsing fluid is forced upwardly in relatively different planes against the cup-shaped dishes in the basket 76 to be splashed by deflection onto the dishes in the rack 79. Obviously, when it is desired to utilize the spraying heads 89 and 92 the valve 85 controlling the nozzle 83 is closed so that the rinsing water will be forced upwardly through the pipe 82.

Referring now specifically to the modification illustrated in Figs. 9 and 10, the dish-tray supporting standards 95 may be conveniently utilized to convey the rinsing fluid and comprise pipes threaded at their ends and provided with the threaded sleeves 101 and 102 adjustable thereon to engage the threaded bosses 103 and 104 on the fittings 105 and 106 having the washers 107, in a manner as best shown in Fig. 10.

The pipe forming the standard 95 is provided with the T-fitting 108 connecting it with the L-shaped inlet fitting 109 corresponding in structure to the fitting 80 illustrated in Fig. 2, and having the annular cap 110 adjustable thereon and serving to retain the rubber washer 111 which is provided with the bore 112 into which the nozzle 113 on the flexible hose pipe 114 leading from a suitable source of fresh water supply may be conveniently inserted to form a watertight seal, it being here noted that the fitting 80 is of like construction.

Said pipe standard 95 is also provided with the valve 115 having the handle 116 which controls the flow of fresh water supply passing into the basin 2 through the orifice 117, and when said valve is closed the rinsing fluid is forced upwardly through said pipe and ejected through the upwardly directed relatively angular saw-cuts 119 and 120 to provide plane slit apertures arranged to direct fan-shaped sprays such as indicated by the dash lines 121 and 122, said dash line 121 indicating the upwardly directed spray against the cupped bowl 123 and the dash line 122 indicating the deflected splash directed downwardly upon the dish 125.

Obviously, the machine may be conveniently provided with two of the standards 95 shown in Fig. 9 and they may be connected in any suitable manner to convey rinsing fluid therethrough, or they may each be provided with inlet fitting 109 such as shown in Fig. 9.

As shown in Fig. 9, the standard 95 may be provided with the transverse strut 126 vertically adjustable thereon if desired and having a centrally disposed T-fitting 127 serving as a bearing for the lower frame 129 of the door or closure 17.

My invention is advantageous in that by the arrangement of the cooperative parts all of the fluid is directed upwardly from the nozzles into the bowl-shaped dishes and is thereby deflected with force and splashed downwardly on to the dishes on the racks beneath. Thus the dishes to which grease mostly adheres, or what may be considered the more soiled dishes, and silverware carried by the lower trays are subjected to the action of all of the fluid discharged from the nozzles of both of the manifolds and the rinsing heads.

This machine is especially designed for use in private homes where all types of dishes from the table may be quickly and thoroughly washed at a single operation and wherein the cleansing fluid may be conveniently discharged and rinsing water substituted without stopping the actuating mechanism.

I do not desire to limit my invention to the precise details of construction and arrangement as herein set forth, as it is obvious that various modifications may be made therein without departing from the essential features of my invention as defined in the appended claims.

Having thus described my invention, I claim:

1. A dish-washing machine comprising a receptacle having a door affording free access thereto, vertically adjustable means arranged to removably support dishes therein disposed in relatively spaced sets positioned one above the other, means within said receptacle arranged to rotate between said sets and to direct sprays of cleansing fluid upwardly in a series of circular paths, and non-rotatable means provided with plane slits forming apertures disposed between said sets arranged to direct fan-shaped sprays of rinsing fluid upwardly in a plurality of relatively different predetermined planes, all of said sprays being directed upwardly to impinge against the superposed set of dishes and be deflected thereby downwardly upon the subjacent set of dishes.

2. A dish-washing machine comprising a semicylindrical casing, and a semicylindrical door pivoted to rotate with respect to said casing, means arranged to support sets of dishes in relatively spaced relation disposed one above the other and comprising hollow standards provided with outlet apertures, a sprayer head disposed between said spaced means of support and arranged to project sprays of cleansing fluid upwardly to strike the superposed dishes and be deflected thereby downwardly upon the subjacent dishes, and means connecting said hollow standards with a source of rinsing fluid.

3. A dish-washing machine comprising a receptacle having a semi-cylindrical casing and a semi-cylindrical door revoluble therein, a pair of tubular uprights provided with outlet apertures in said receptacle, tray supporting means adjustably supported by said uprights, and pipe connections with said uprights leading exterior to said casing and having an intake fitting for injecting fluid through said tray supporting uprights.

4. A dish-washing machine comprising a receptacle having a semi-cylindrical casing and a semi-cylindrical door revoluble therein to form a cylindrical casing, uprights forming supports within said receptacle, annular carriers disposed between said uprights and arranged to carry trays of dishes and having means slidable on said supports, and means arranged to secure said carriers to said supports in any vertically adjusted position.

5. A dish-washing machine comprising a receptacle having a semi-cylindrical casing and a semi-cylindrical door revoluble with respect thereto to form a cylindrical casing when closed, removable and replaceable uprights serving as supports within said receptacle, carriers slidably adjustable up and down said uprights and arranged to carry trays of dishes, and means arranged to secure said carriers to said uprights in different adjusted positions.

6. A dish-washing machine comprising a receptacle having a semi-cylindrical casing provided with a floor and cover, a canopy beneath said cover in spaced relation thereto, fittings attached to said floor and canopy, uprights removably connected with said fittings, tray carriers adjustably supported by said uprights, and means arranged to secure said carriers in different adjusted positions.

7. A dish-washing machine comprising a cylindrical receptacle of which approximately one-half opens as a door affording easy access to the chamber therein, sprayers disposed in said receptacle, uprights spaced from the walls of said receptacle within said chamber, carriers slidably supported peripherally on said uprights and adjustable with respect to said sprayers, means arranged to secure said carriers to said uprights in adjusted position, and dish-holding trays supported on said carriers.

8. A dish-washing machine comprising a receptacle having cylindriform side walls including a door and top and bottom walls, threaded fittings attached to said top and bottom walls, supporting standards removably and replaceably alined with said fittings and threaded sleeves adjustable on said standards to engage the threaded fittings and rigidly secure said standards.

9. A dish-washing machine comprising a receptacle having cylindriform side walls including a door and top and bottom walls, threaded fittings attached to said top and bottom walls, supporting standards removably and replaceably alined with said fittings and threaded sleeves adjustable on said standards to engage the threaded fittings and rigidly secure said standards, carriers slidably adjustable on said standards, and means arranged to secure said carriers to said standards, said carriers being adapted to support dish-carrying trays.

10. A dish-washing machine comprising a receptacle having cylindriform side walls including a door and top and bottom walls, fittings attached to said top and bottom walls, hollow supporting standards removably and replaceably engaged with said fittings, and having openings therein arranged to direct jets of fluid upwardly in an inclined direction, and having fluid intake means connected therewith and extended exterior to said receptacle and connected with a source of fluid supply, and carriers slidably adjustable on said standards and arranged to support trays of dishes in position to be sprayed by said jets.

11. A dish-washing machine comprising a receptacle, hollow standards disposed in said receptacle and having openings through which sprays of fluid may be ejected, and having a fitting extended exterior to said receptacle to be connected with a source of fluid supply, and dish supporting carriers slidably adjustable up and down said standards with respect to said spray openings, and means arranged to secure said carriers thus adjusted.

12. A dish-washing machine comprising a receptacle having a closure, means arranged to support sets of dishes in relatively spaced relation disposed one above the other in said receptacle and comprising a hollow standard affording a conduit having an orifice therein through which fluid may be injected into said receptacle, and a plurality of upwardly inclined spray apertures in said standard being disposed between the relatively adjacent dish supporting means, a valve in said conduit arranged to control the flow of fluid through said orifice, and a fluid inlet fitting disposed in said hollow standard between said valve and said inclined spray apertures and provided with an intake for connection with a source of fluid exterior to said receptacle.

FRANK G. WALKER.